United States Patent [19]

Lieding

[11] 3,967,808
[45] July 6, 1976

[54] IRRIGATION VALVE WITH METAL SEAT
[75] Inventor: Calvin A. Lieding, Glendora, Calif.
[73] Assignee: Irrigation Specialties Company, San Gabriel, Calif.
[22] Filed: Sept. 22, 1975
[21] Appl. No.: 615,587

[52] U.S. Cl. .................................. 251/46; 251/359; 251/365
[51] Int. Cl.² ...................................... F16K 25/00
[58] Field of Search ................ 251/365, 359, 45, 46

[56] References Cited
UNITED STATES PATENTS

| | | |
|---|---|---|
| 801,458 | 10/1905 | Huxley ............................... 251/365 |
| 3,318,565 | 5/1967 | Cutler ................................... 251/45 |
| 3,347,519 | 10/1967 | Engstrom ............................ 251/365 |

Primary Examiner—Arnold Rosenthal
Attorney, Agent, or Firm—Christie, Parker & Hale

[57] ABSTRACT

A diaphragm-type irrigation valve having a molded plastic body, and including a metal valve-seat ring with sidewalls embedded in the plastic body. The seat ring has a generally U-shaped cross-section, at least one ring sidewall being non-parallel to a central axis of the ring. An O-ring seal is positioned within the ring to bear against the plastic material in which the sidewalls are embedded.

7 Claims, 4 Drawing Figures

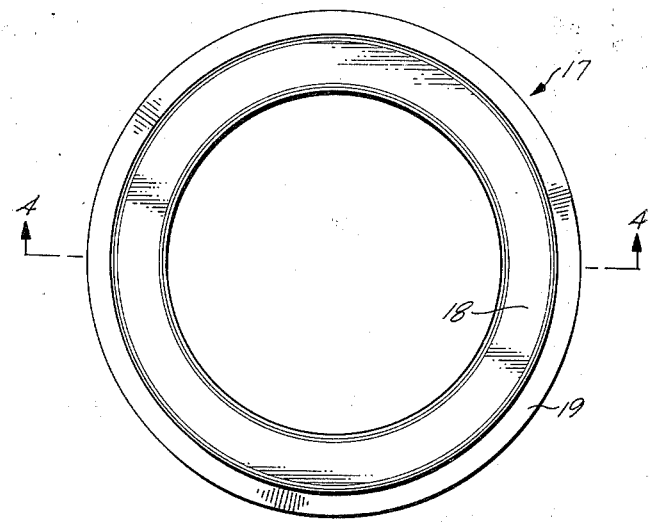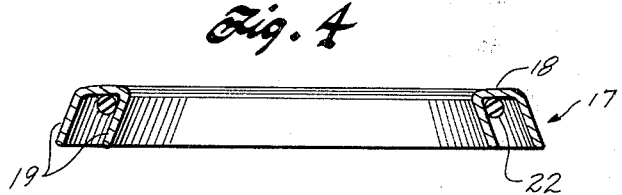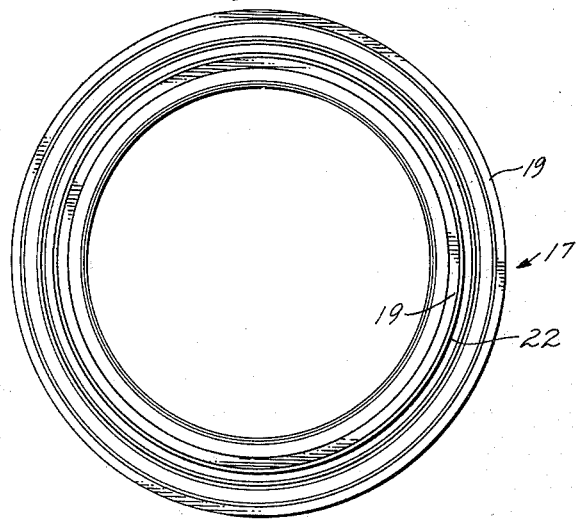

IRRIGATION VALVE WITH METAL SEAT

BACKGROUND OF THE INVENTION

Pilot-activated diaphragm-operated valves for use in irrigation systems are known, and a typical example is shown in U.S. Pat. No. 3,336,843. This style of valve has a closure member with a seal which moves against or away from an annular seat to close or open the valve. The closure member is driven by a flexible diaphragm which is normally urged toward a closed position by a spring and by upstream fluid pressure acting against the diaphragm. When the valve is to be opened, the fluid pressure is relieved by bleeding fluid out of the diaphragm chamber through a manual valve or a remotely operated solenoid valve.

In recent years, valves of this type have been made from plastic rather than metal components. Plastic materials (such as PVC) have substantially eliminated the corrosion and mineral-deposit problems which have limited the service life of metal valves, and plastic valves are readily coupled to water lines. Plastic valve seats, however, have not been reliable because the plastic material is too easily scratched, chipped or abraded by sand or small stones in the irrigation water stream, and this damage results in water leakage and a need for frequent maintenance.

Attempts have been made to incorporate a generally cylindrical metal seat ring in a plastic valve body, but the failure rate on these valves is excessive due to an inadequate bond between the ring and plastic which have different thermal expansion properties. Loosening of this style of metal seat can also occur during distortion of the plastic valve body resulting from transient hydraulic shock when the valve is opened and closed. The metal valve-seat ring of this invention solves these problems by enabling economical molded-in construction with a rugged and abrasion-resistant stainless-steel ring which is physically locked into the valve body.

SUMMARY OF THE INVENTION

Briefly stated, this invention relates to an improved seat ring for use in a fluid valve having a body made of a plastic material (such as polyvinyl-chloride plastic), the body defining a fluid passage therethrough and having a seal which is movable toward and away from an internal surface of the body around the fluid passage to close and open the valve. The improved seat ring is preferably made of stainless steel, and has a generally U-shaped cross-section formed by a seat portion and a pair of spaced-apart sidewalls integrally formed with and extending from the seat portion. The sidewalls are non-parallel and oblique to a central axis of the ring to mechanically lock the ring into the plastic body. The sidewalls are embedded in the body to position the seat portion at the internal surface of the valve body in seating engagement with the movable seal when the valve is closed. Preferably, an O-ring seal is positioned within the metal seat ring to prevent any slight leakage between the ring and plastic valve body.

DESCRIPTION OF THE DRAWINGS

FIG. 2 is a top plan view of a seat ring used in the valve;

FIG. 3 is a bottom view of the seat ring; and

FIG. 4 is a section on line 4—4 of FIG. 2.

DESCRIPTION OF THE PREFERRED EMBODIMENT

Figure 1:
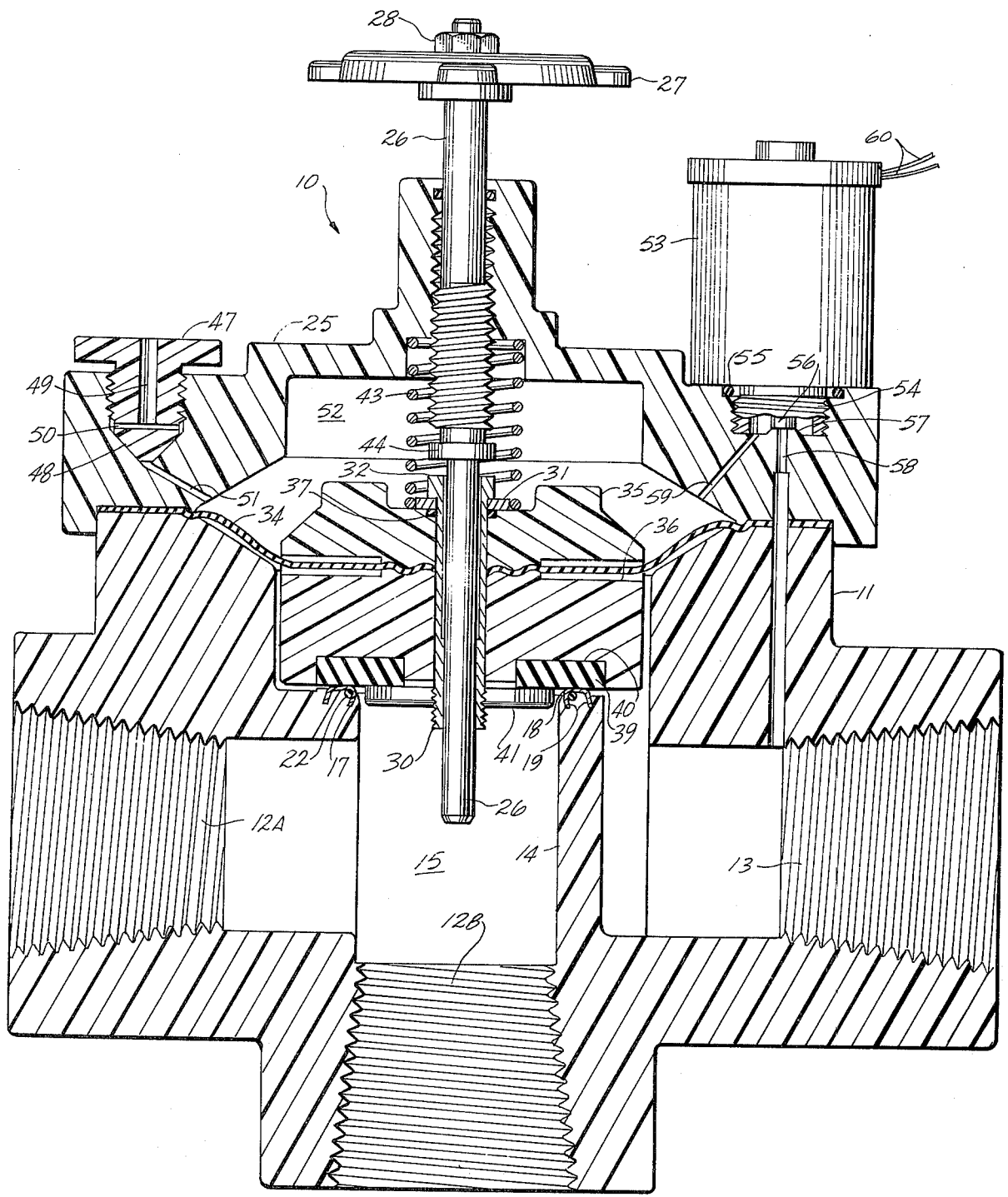
FIG. 1 is a sectional elevation of a valve according to the invention.

A fluid valve 10 according to the invention is shown in FIG. 1, and the valve includes a main body 11 which is preferably molded from PVC or a similar plastic material. Body 11 defines a pair of threaded inlet conduits 12A and 12B oriented at right angles to each other so the valve can be connected to either a horizontal or vertical fluid supply line (not shown). The unused inlet conduit is plugged when the valve is installed.

An outlet conduit 13 extends into the valve body opposite inlet conduit 12A, and is threaded for connection to a plastic or metal pipe leading to sprinklers or other fluid-delivery apparatus. A hollow and generally cylindrical wall 14 within the valve body is in fluid communication with the inlet conduits, and forms a flow passage 15 to the outlet conduit.

A circular seat ring 17 (FIGS. 1-4) is molded into the valve body at the upper end of wall 14. Ring 17 is preferably made from stainless steel (18-8 Type 302/304 is satisfactory) to resist chemical corrosion and abrasion from sand or rocks carried through the valve in the fluid stream. Ring 17 is generally U-shaped in cross-section, and includes a slightly domed seat portion 18 positioned above the upper end of wall 14.

A pair of spaced-apart sidewalls 19 extend downwardly from the seat portion into the plastic material forming wall 14. At least one, and preferably both of sidewalls 19, are oblique and non-parallel to a central axis of the ring. That is, the sidewalls slope either radially inwardly or radially outwardly with respect to a central axis of the ring to insure that the ring is securely locked in place after being molded into the valve body.

Preferably, a conventional O-ring seal 22 is positioned within seat ring 17 prior to the ring being molded into the valve body. This seal insures that fluid leakage will not occur beneath the seal and around flow lines in wall 14 which are formed when the body is molded.

A generally circular body cover 25 extends over the top of body 11, and is secured to the body by screws (not shown). A metering rod 26 is threaded through cover 25 to extend into flow passage 15. A valve handle 27 is secured at the upper end of the metering rod by a retaining nut 28.

A guide sleeve 30 makes a loose slip fit over the inner end of metering rod 26, and a washer 31 is positioned against an outwardly extending flanged head 32 at the upper end of the guide sleeve. A circular flexible diaphragm 34 is sandwiched between body 11 and cover 25, and the diaphragm has a central opening through which guide sleeve 30 extends. Positioned on opposite sides of diaphragm 34 are an upper carrier disk 35 and a lower carrier disk 36, the disks preferably being molded from PVC plastic. Upper disk 35 abuts washer 31 at the upper end of the guide sleeve, and O-ring seal 37 is seated between these parts.

An elastomeric annular valve seat 39 (neoprene or Buna-N material is satisfactory) is cemented or otherwise secured in a recess 40 in the underside of lower carrier disk 36 to act as a valve closure member. A choke washer 41 is threaded on the lower or inner end of guide sleeve 30 to secure the carrier disks on the guide sleeve and sealingly against diaphragm 34. A compression spring 43 is positioned between cover 25 and the upper surface of upper carrier disk 35 to urge the carrier disks toward wall 14 to place valve seal 39 in mating engagement with seat ring 17 as shown in FIG. 1. A stop flange 44 extends from metering rod 26 to limit upward travel of the carrier disks and valve seal when the valve is opened.

A manual operating valve 47 for fluid valve 10 is threaded into the top of cover 25, and the lower end 48 of valve 47 is conically tapered to seat in a mating recess in the cover. A central opening 49 extends downwardly through the threaded shaft of valve 47 into communication with a crossbore 50 extending through the shaft just above lower end 48. A bleed passage 51 extends through cover 25 to place the tip of lower end 48 of the manual operating valve in fluid communication with fluid in a diaphragm chamber 52 between the inside of cover 25 and the upper surfaces of diaphragm 34 and upper carrier disk 35.

An electrical operating valve 53 has a sleeve 54 at its lower end which is threaded into the top of cover 25, and an O-ring seal 55 is positioned between the undersurface of the valve housing and cover 25. A solenoid (not shown) is positioned within the valve housing, and the solenoid plunger has an elastomeric tip 56 which seats against a circular boss 57 on cover 25. An outlet passage 58 extends from boss 57 through the cover, diaphragm 34, and body 11 into fluid communication with outlet conduit 13. A bleed passage 59 extends from diaphragm chamber 52 into fluid communication with the annular space around tip 56 and boss 57.

The electrical operating valve includes an internal spring (not shown) which normally urges tip 56 against boss 57 to close the upper end of outlet passage 58. Electrical leads 60 from the valve are connected to a voltage source to enable remote energization of the solenoid to lift tip 56 away from boss 57 and thereby to open the outlet passage.

In operation, valve 10 is connected to inlet and outlet lines, and fluid flows through the inlet conduit into flow passage 15. Sufficient clearance exists between guide sleeve 30 and metering rod 26 to permit a slight flow of fluid between these parts into the diaphragm chamber above diaphragm 34. Full upstream fluid pressure accordingly acts on the diaphragm, and this force, coupled with the force of compression spring 43, urges valve seal 39 downwardly into fluid-sealing engagement with seat ring 17 to close the valve.

If the valve is to be manually opened, manual valve 47 is rotated to lift lower end 48 away from its seat, thereby permitting fluid to be vented from diaphragm chamber 52 of the valve through opening 49 and crossbore 50. When the fluid pressure in the upper chamber is so relieved, fluid pressure in the inlet side of the valve is sufficient to overcome the force of compression spring 43, and to raise valve seal 39 upwardly away from seat ring 17 to permit flow through the valve.

When the valve is open, flanged head 32 of guide sleeve 30 abuts stop flange 44 and the stop flange may be adjustably positioned by rotating metering rod 26 to achieve a desired flow rate. The valve is manually closed by closing manual operating valve 47 to block bleed passage 51. Fluid pressure then again builds up in the upper chamber of the valve to drive seal 39 downwardly against seat ring 17.

Electrical operation of the valve is similar in that bleed flow from the upper chamber is blocked by tip 56 to close the valve when the solenoid is not energized. Upon energization of the solenoid in electrical valve 53, tip 56 is lifted away from boss 57 to place passages 58 and 59 in fluid communication, bleeding the fluid pressure from the upper chamber and allowing the fluid pressure in the inlet chamber to open the valve. Valve closure is obtained by disabling the solenoid in electrical valve 53 to re-seat tip 56 against boss 57. Choke washer 41 extends slightly into flow passage 15 as the valve approaches the closed position to reduce fluid flow and minimize hydraulic shock when closure is achieved.

The fluid valve described above is well suited for application in irrigation systems for control of irrigation water which may have a relatively high content of sand or other abrasive material. The stainless-steel seat ring insures good abrasion resistance and long valve life when used with contaminated fluids of this type. The main valve housing, however, is constructed of durable and economical plastic materials. A particular advantage of the valve is the use of sloping sidewalls on the seat ring to insure that the ring is securely retained within the plastic valve body over the full operating temperature range of the valve, and during expansion or contraction of the valve body which may occur due to hydraulic shock during valve opening or closure.

I claim:
1. A fluid valve, comprising:
    a valve body made of a plastic material and defining a flow passage therethrough with inlet and outlet conduits at opposite ends of the passage;
    a metal seat ring having a generally U-shaped cross-section defined by a seat portion and a pair of spaced-apart sidewalls extending from the seat portion, the sidewalls being embedded in the plastic valve body to position the seat portion around the flow passage between the inlet and outlet conduits, at least one of the sidewalls being non-parallel to a central axis of the ring;
    a valve closure member mounted in the valve body to be movable into seating engagement with the seat portion to close the valve; and
    means on the valve body and connected to the closure member for moving the closure member against and away from the seat portion to close and open the valve.

2. The valve defined in claim 1, and further comprising an O-ring seal positioned within the seat ring and bearing against the seat ring and plastic body.

3. The valve defined in claim 2 wherein both sidewalls of the ring are non-parallel to the ring central axis, the ring being formed of stainless steel and the valve body being formed of polyvinyl-chloride plastic.

4. In a pilot-operated diaphragm-type irrigation valve having a plastic body defining a flow passage therethrough, the valve including a diaphragm actuable to move a seal toward and away from an internal surface of the body around the flow passage to close and open the valve, an improved valve seat comprising:
    a metal seat ring having a generally U-shaped cross-section formed by a seat portion and a pair of spaced-apart sidewalls integrally formed with and extending from the seat portion, the sidewalls being oblique to a central axis of the ring, the sidewalls being embedded in the valve body to position the seat portion at said internal surface of the valve body in seating engagement with the movable seal when the valve is closed.

5. The improvement defined in claim 4 and further comprising an O-ring seal positioned within the seat ring and bearing against the seat ring and plastic body.

6. The improvement defined in claim 5 wherein the seat ring is formed of stainless steel and the valve body is formed of polyvinyl-chloride plastic.

7. The improvement defined in claim 6 wherein the seat portion of the seat ring is convex toward the seal.

\* \* \* \* \*

REEXAMINATION CERTIFICATE (375th)
United States Patent [19]
Lieding

[11] B1 3,967,808
[45] Certificate Issued Sep. 3, 1985

[54] IRRIGATION VALVE WITH METAL SEAT

[75] Inventor: Calvin A. Lieding, Glendora, Calif.

[73] Assignee: Irrigation Specialties Company, San Gabriel, Calif.

Reexamination Request:
No. 90/000,462, Oct. 24, 1983

Reexamination Certificate for:
Patent No.: 3,967,808
Issued: Jul. 6, 1976
Appl. No.: 615,587
Filed: Sep. 22, 1975

[51] Int. Cl.³ .............................................. F16K 25/00
[52] U.S. Cl. ...................................... 251/46; 251/359; 251/365
[58] Field of Search ............................... 251/328, 368

[56] References Cited
U.S. PATENT DOCUMENTS

| | | |
|---|---|---|
| 1,266,324 | 5/1918 | Schacht . |
| 2,628,062 | 2/1953 | Weber ............................. 251/368 X |
| 2,844,352 | 7/1958 | Dahl . |
| 3,189,319 | 6/1965 | Bredtschneider .................... 251/328 |
| 3,575,381 | 4/1971 | Gilmore . |

FOREIGN PATENT DOCUMENTS 2281 of 1906 United Kingdom .

OTHER PUBLICATIONS

1972, Cla-Val Co. Brochure; Clayton 1200A Remote Control Valve.

*Primary Examiner*—Arnold Rosenthal

[57] ABSTRACT

A diaphragm-type irrigation valve having a molded plastic body, and including a metal valve-seat ring with sidewalls embedded in the plastic body. The seat ring has a generally U-shaped cross-section, at least one ring sidewall being non-parallel to a central axis of the ring. An O-ring seal is positioned within the ring to bear against the plastic material in which the sidewalls are embedded.

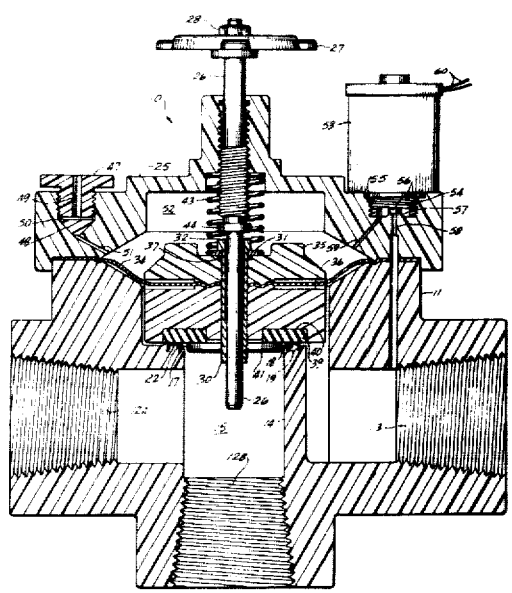

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 2 and 5 are cancelled.

Claims 1, 3, 4 and 6 are determined to be patentable as amended.

Claim 7, dependent on an amended claim, is determined to be patentable.

1. A fluid valve, comprising:
  a *molded* valve body made of a plastic material and defining a flow passage therethrough with inlet and outlet conduits at opposite ends of the passage;
  a *pre-formed* metal seat ring having a generally U-shaped cross-section defined by a seat portion and a pair of spaced-apart sidewalls extending from the seat portion, the sidewalls being embedded in the plastic valve body *without substantial deformation when the body is molded* to position the seat portion around the flow passage between the inlet and outlet conduits, at least one of the sidewalls being non-parallel to a central axis of the ring;
  *an O-ring seal positioned within the seat ring and bearing against the seat ring and plastic body;*
  a valve closure member mounted in the valve body to be movable into seating engagement with the seat portion to close the valve; and
  means on the valve body and connected to the closure member for moving the closure member against and away from the seat portion to close and open the valve[.];
  *the seat ring terminating in a direction toward the closure member at the seat portion to permit free flow of fluid between the seat ring and closure member lateral to an axis of movement of the closure member when the valve is open.*

3. The valve defined in claim [2] *1* wherein both sidewalls of the ring are non-parallel to the ring central axis, the ring being formed of stainless steel and the valve body being formed of polyvinyl-chloride plastic.

4. In a pilot-operated diaphragm-type irrigation valve having a *molded* plastic body defining a flow passage therethrough, the valve including a diaphragm actuable to move a seal toward and away from an internal surface of the body around the flow passage to close and open the valve, an improved valve seat comprising:
  a *pre-formed* metal seat ring having a generally U-shaped cross-section formed by a seat portion and a pair of spaced-apart sidewalls integrally formed with and extending from the seat portion, the sidewalls being oblique to a central axis of the ring, the sidewalls being embedded in the valve body *without substantial deformation when the body is molded* to position the seat portion at said internal surface of the valve body in seating engagement with the movable seal when the valve is closed[.]; *and an O-ring seal positioned within the seat ring and bearing against the seat ring and plastic body; the seat ring terminating in a direction toward the movable seal at the seat portion to provide an open flow passage between the seat ring and movable seal lateral to an axis of movement when the valve is open.*

6. The improvement defined in claim [5] *4* wherein the seat ring is formed of stainless steel and the valve body is formed of polyvinyl-chloride plastic.

* * * * *